Feb. 21, 1967  F. V. CARTER ETAL  3,305,686
HELIOTROPIC DEVICE WITH THERMOCOUPLE SENSORS
Filed July 23, 1963  3 Sheets-Sheet 1

INVENTORS
FRED V. CARTER
DALLAS R. JONES

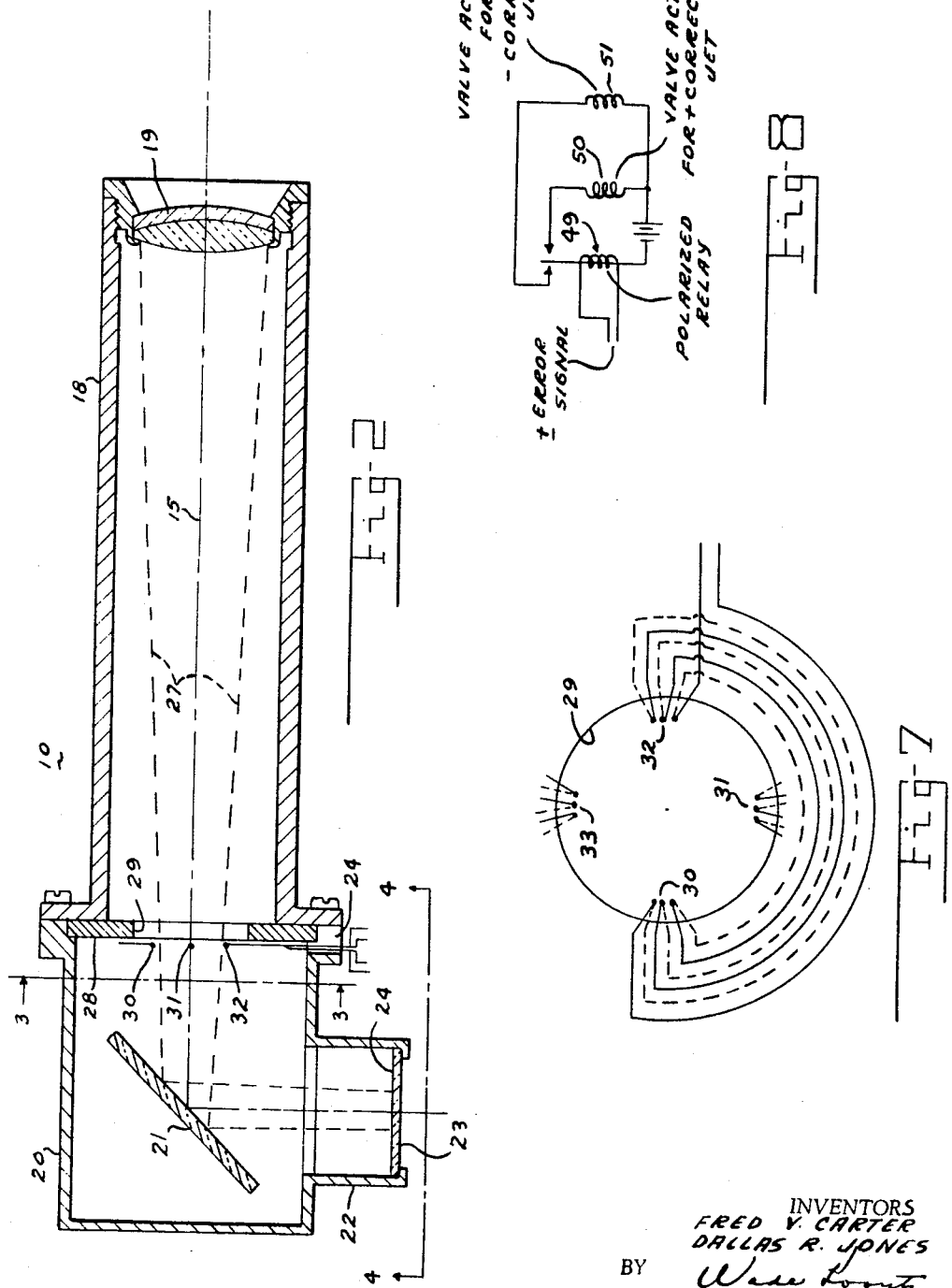

Feb. 21, 1967   F. V. CARTER ETAL   3,305,686
HELIOTROPIC DEVICE WITH THERMOCOUPLE SENSORS
Filed July 23, 1963                     3 Sheets-Sheet 3
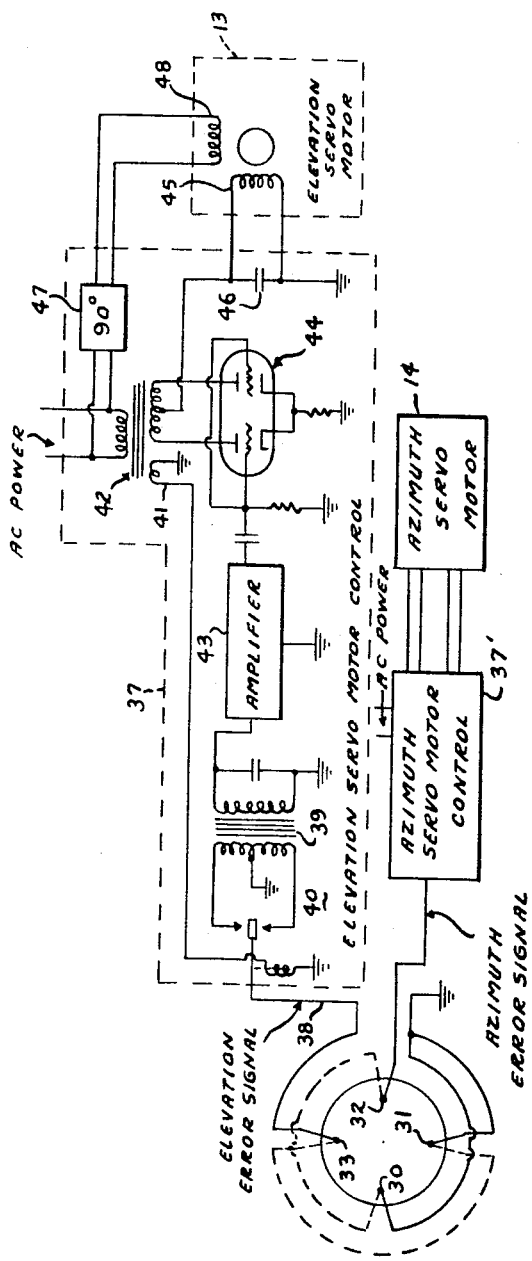
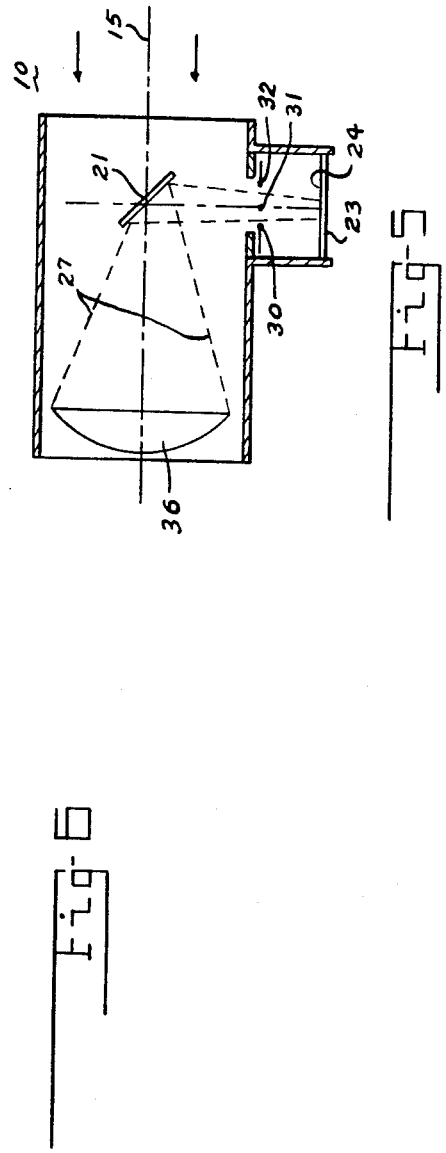
INVENTORS
FRED V. CARTER
DALLAS R. JONES
BY
ATTORNEY
AGENT United States Patent Office 3,305,686
Patented Feb. 21, 1967

3,305,686
HELIOTROPIC DEVICE WITH THERMO-
COUPLE SENSORS
Fred V. Carter, R.R. 3, New Carlisle, Ohio 45344, and
Dallas R. Jones, 79 Haddon Court, Xenia, Ohio 45383
Filed July 23, 1963, Ser. No. 297,163
2 Claims. (Cl. 250—203)

The invention described herein may be manufactured and used by or for the United States Government for governmental purposes without payment to us of any royalty thereon.

The primary purpose of this invention is to provide a heliotropic device for automatically keeping a solar energy receptor pointed toward the sun. Other purposes are to provide a heliotropic device that is insensitive to light so as to prevent capture by other purely light sources in space and that has a low electrical input impedance to minimize its sensitivity to electrical disturbances.

Briefly, the device comprises a lens for bringing the sun's rays to focus. At a position intermediate the lens and its focal plane there are located four thermocouple transducers spaced 90° apart on a circle centered on and normal to the optical axis of the lens. The diameter of the circle is made such that the transducers are positioned at or just outside the surface of the truncated cone of radiation extending from the lens to the focal plane. Opposite pairs of these transducers are connected in series opposed relationship to provide two error signal circuits corresponding to the two orthogonal axes defined by the transducers. When the optical axis of the lens is in perfect alignment with the center of the sun, the truncated cone of rays extending between the lens and its focal plane is centered on the optical axis of the lens. Therefore, any radiant energy that falls upon the four transducers will be small and of the same intensity for each transducer. Consequently, the error signals generated in the two error signal circuits are both zero. In the case of an alignment error, however, the axis of the cone is angularly displaced from the axis of the lens and radially displaced from the center of the transducer circle, resulting in an imbalance in the radiant energy incident on the transducers of either or both pairs. This results in the generation of an error signal or error signals in either or both of the error signal circuits which may be utilized in a suitable servo system to correct the alignment of the optical axis of the lens with respect to the center of the sun. The device may employ a parabolic reflector instead of a lens if desired.

Figure 1:
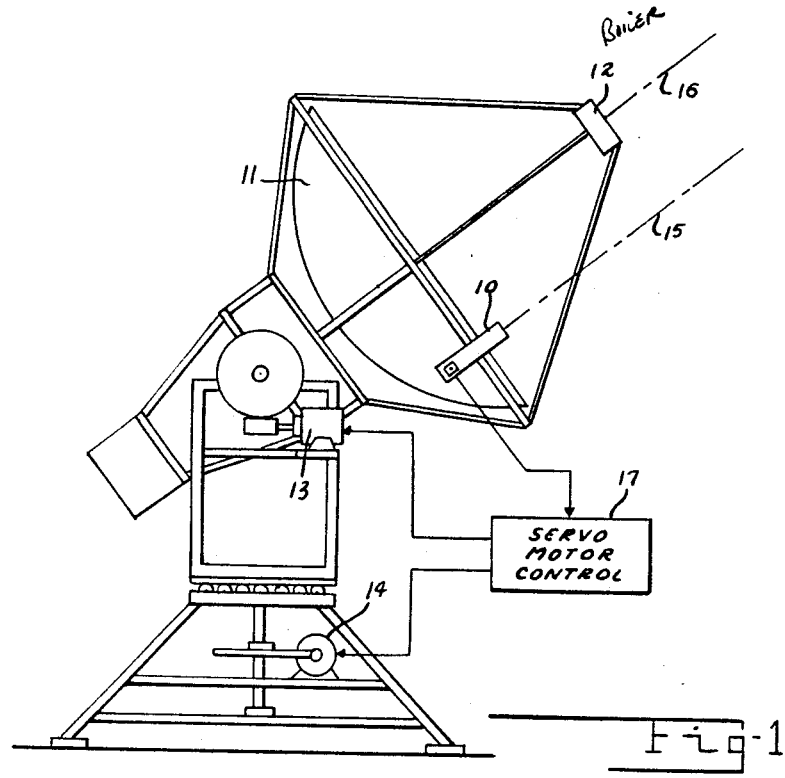
Figures 3, 4:
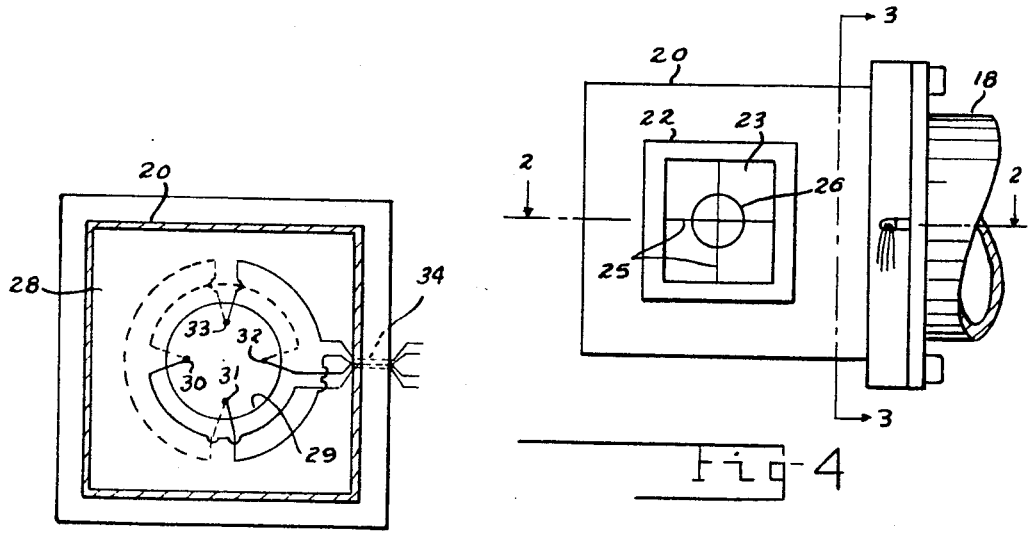

The invention will be explained in more detail with reference to the specific embodiments thereof shown in the accompanying drawings in which FIG. 1 illustrates a typical application of the heliotropic device, FIG. 2 shows a horizontal cross-section of an alignment error sensor using a lens, FIG. 3 is a section of the sensor of FIG. 2 along plane 3—3, FIG. 4 is a view of the sensor of FIG. 2 in the direction 4—4, FIG. 5 is a horizontal cross-section of another embodiment of the alignment error sensor similar to that in FIG. 2 but using a parabolic reflector instead of a lens, FIG. 6 shows a suitable servo system for use with the alignment error sensor of either FIG. 2 or FIG. 5, FIG. 7 illustrates the method of coupling the thermocouples of a transducer pair where more than one thermocouple is used in a transducer, and FIG. 8 illustrates a suitable jet servo system for use with the described alignment error sensor to control the orientation of a solar energy receptor in space.

Referring to FIG. 1, which shows a typical application of the invention to a solar receptor, the alignment error sensor 10 and associated servo system are used to keep the optical axis of parabolic reflector 11 in alignment with the center of the sun. Mounted at the focus of reflector 11 is a suitable element 12 for converting the focused radiant energy into energy in another form. For example, the element 12 may be a boiler for converting the received radiation first into heat and then into superheated steam for a steam turbine driven electrical generator (not shown). The reflector 11 and element 12 are supported by a suitable framework which may be rotated about horizontal and vertical axes through the agencies of elevation servomotor 13 and azimuth servomotor 14, respectively. The alignment error sensor 10 is mounted on this framework with its optical axis 15 exactly parallel to the optical axis 16 of reflector 11. A deviation in the alignment of axis 15, and, therefore, axis 16, with respect to the center of the sun causes sensor 10 to produce an error signal or error signals for application to servomotor control 17 which energizes servomotors 13 and 14 as required to reduce the alignment error to zero.

One embodiment of the alignment error sensor 10 is illustrated in FIG. 2. It comprises a tubular member 18 having a lens 19 at one end and having a rectangular housing 20 attached to its other end. Housing 20 contains a mirror 21 set at 45° to produce a 90° change in direction of the optical axis 15 of the lens. Rectangular extension 22 of housing 20 supports a glass plate 23 having a ground inner surface 24 coinciding with the focal plane of lens 19. The ground surface of plate 23 may be provided with cross hairs 25 and a circle 26, slightly larger than the sun's image, as seen in FIG. 4, to define the optical axis of the sensor and to aid in its visual alignment with the center of the sun.

When the optical axis 15 passes through the center of the sun as visually observed the sun's rays being brought to focus on surface 24 by lens 19 define and are contained within a truncated cone the surface of which is defined by broken lines 27 and the axis of which coincides with the optical axis 15 of the lens. A rectangular plate 28 is held between tubular element 18 and housing 20 and has a circular opening 29 considerably larger than the cone 27. The purpose of this plate is to support the four thermocouple transducers 30, 31, 32 and 33, better seen in FIG. 3. In the example shown, each transducer consists of a single thermocouple of two dissimilar metals, one metal being indicated by solid lines and the other by broken lines. For example, the solid lines may represent copper and the broken lines may represent constantan. Plate 29 may be made of metal or of an insulating material such as a suitable ceramic material. If made of metal, the thermocouple components may be insulated therefrom in any suitable manner. Oppositely disposed thermocouples are connected in series opposed relationship, as shown in FIG. 3, to provide two error signal circuits the leads for which may be brought out through slot 34 in housing 20.

The thermocouples are so supported that their junctions lie 90° apart on the circumference of a circle normal to and centered on the optical axis 15. The diameter of this circle is made slightly greater than the diameter of the cone of radiation 27 at the circle so that, when the alignment error of the sensor 10 is zero, the four thermocouples are positioned just outside the cone of radiation 27 by equal small distances. Consequently, for zero alignment error, the radiation falling upon each of the four thermocouples is zero, or else of very low intensity and equal to that falling on the other thermocouples. As a result, the net voltage produced in each of the two error signal circuits is zero. On the other hand, when the optical axis 15 is not in alignment with the center of the sun, the axis of the cone of radiation 27 is angularly displaced from axis 15 and the center of the cone is radially displaced from the center of the thermocouple circle. This causes an imbalance in the radiation falling upon the two thermocouple transducers in either or both of the error signal circuits so that a net error voltage occurs at the output terminals of either or both of these circuits.

Where corrections in alignment are made by rotating the solar receptor about two orthogonal axes, such as the horizontal and vertical axes about which rotation is effected by servomotors 13 and 14 in FIG. 1, each of the two orthogonal diameters of the above-described transducer circle that pass through the four transducers must be normal to one of the orthogonal axes. Thus, in FIGS. 1-2-3, the diameter through transducers 30 and 32 is normal to the vertical axis and the diameter through transducers 31 and 33 is normal to the horizontal axis.

FIG. 5 shows a modification of the alignment error sensor 10 in which a parabolic reflector 36 is utilized in place of lens 19 of FIG. 2. As in FIG. 2, the solar rays being brought to focus at focal plane 24 by the reflector 36 are contained in a truncated cone 27. The thermocouples have the same relation to the radiation cone as in FIG. 2 but in this case are positioned between mirror 21 and ground glass screen 23 in order to minimize obstruction to the solar rays reaching reflector 36. The operation is similar in all respects to that of FIG. 2.

FIG. 6 illustrates a suitable form for the servomotor control 17 of FIG. 2. The control system is made up of an elevation servomotor control circuit 37 and a similar azimuth servomotor control circuit 37'. An alignment error in elevation causes one of the thermocouples 31-33 to receive more radiation and rise to a higher temperature than the other producing a net error signal at the input 38 of elevation sevomotor control 37. Since the thermocouples are oppositely poled in the series circuit in which they are connected, the polarity of the direct error voltage on conductor 38 is indicative of the sign of the elevation error. The direct error voltage is converted to a sine wave of A.C. power source frequency at the secondary transformer 39 by chopper 40 driven from auxiliary winding 41 of power transformer 42. The A.C. error signal is amplified in amplifier 43 and applied in parallel to the grids of grid controlled rectifier 44.

The phase of the A.C. error signal on the grids of rectifier 44 is either the same as or opposite to that at the primary of transformer 42 depending upon the polarity of the D.C. error signal; also, the phase on one anode of rectifier 44 is the same as that at the transformer primary and the phase at the other anode is opposite to that at the transformer primary. Therefore, depending upon the polarity of the D.C. error signal on line 38, one of rectifiers 44 is conductive since its anode and grid have the same phase whereas the other is nonconductive since the anode and grid are opposed in phase. The conductive rectifier applies half-cycles of voltage to winding 45 of the two-phase servomotor 13. This winding is tuned to the power line frequency by capacitor 46 so that a sine wave of current flows in it that is either in phase with or 180° out of phase with the power line voltage at the primary of transformer 42 depending upon the polarity of the error signal on line 38. The power line voltage at the primary of transformer 42 is shifted 90° in phase by element 47 and applied to the other winding 48 of motor 13. Consequently, the current in winding 45 always has a quadrature phase relation to that in winding 48 and is either leading or lagging depending upon the polarity of the error signal. Therefore, the direction of rotation of motor 13 is determined by the polarity of the error signal on input 38 and hence by the sign of the alignment error. No torque is developed by motor 13 when the error signal is zero.

An alignment error in azimuth causes one of the thermocouples 30-32 to receive more radiation and rise to a higher temperature than the other producing a net azimuth error signal at the input of azimuth servomotor control 37'. The construction and operation of this circuit is identical to that of circuit 37 described above.

The sensitivity of the alignment error sensor may be increased by using more than one thermocouple in each of the thermocouple transducers 30, 31, 32 and 33. FIG. 7 illustrates the method of connecting the thermocouples in the azimuth error signal circuit where each of the transducers 30 and 32 consists of three thermocouples. The elevation error signal circuit comprising three-thermocouple transducers 31 and 33 is connected in the same manner. The thermocouple junctions of each transducer should be placed as closely together as possible on the circumference of the transducers circle with the transducer centers separated by 90°.

The alignment error sensor 10 may be used for the orientation of solar receptors in space using jets as servomotors. FIG. 8 shows a servo system of this type for controlling the orientation about one of the two orthogonal axes. By using transducers with several thermocouples, as in FIG. 7, an error signal may be obtained of sufficient power to operate a sensitive polarized relay 49. One or the other of solenoids 50 and 51 for operating valves controlling gas flow to the + correction jet and the — correction jet are energized when the relay is operated to one contact or the other depending upon the polarity of the error signal. An identical servo system is used for alignment adjustments about the other axis.

Although the alignment error sensor has been described as a device for detecting misalignment of its optical axis with the center of the sun, it could obviously be used to detect misalignment with any other source giving off radiation of sufficiently long wavelength to produce significant heating of the thermocouple transducers.

We claim:

1. A heliotropic device for maintaining the optical axis of a solar radiation receptor in alignment with the center of the sun, comprising: a pair of servomotors for rotating said receptor in either direction about a pair of orthogonal axes; an electro-optical alignment error sensor rigidly attached to said receptor; said sensor comprising a focusing means, having an optical axis parallel to the optical axis of said receptor, for bringing the solar rays to focus at a focal plane, the rays being brought to focus defining and being contained within a truncated cone extending from said focusing means to said focal plane and centered on the optical axis of said focusing means when said axis has zero alignment error with the center of the sun; four thermocouple transducers located on the circumference of a circle that is centered on and normal to the optical axis of said focusing means, that is situated between said focusing means and said focal plane and that has a diameter only slightly greater than the diameter of said cone at said circle, said transducers being located on the circumference of said circle at the points of intersection therewith of two orthogonal diameters of said circle each normal to one of said orthogonal axes; a pair of control circuits for said servomotors; and a pair of error signal circuits each containing two diametrically opposite transducers connected in series opposed relationship and each connected to one of said servomotor control circuits to supply an error signal thereto.

2. Apparatus as claimed in claim 1 in which each of said transducers consists of a plurality of thermocouples each formed by the junction of two wires one of copper and the other of constantan and in which, for each pair of diametrically opposite transducers, copper wires from a thermoccuple in each transducer form the output leads of the error signal circuit containing the transducers and the remaining thermocouple wires are, in the case of each thermocouple, continuous with a like wire of a thermocouple in the diametrically opposite transducer.

References Cited by the Examiner

UNITED STATES PATENTS

| | | | |
|---|---|---|---|
| 2,766,387 | 10/1956 | Bolsey | 250—203 |
| 3,205,362 | 9/1965 | Dryden | 250—203 |
| 3,211,912 | 10/1965 | Schwarz | 250—209 |
| 3,225,208 | 12/1965 | Wolfe | 250—212 X |
| 3,229,102 | 1/1966 | Spencer et al. | 250—203 |

RALPH G. NILSON, *Primary Examiner.*

M. A. LEAVITT, *Assistant Examiner.*